United States Patent
Kim (10) Patent No.: US 7,928,978 B2
(45) Date of Patent: Apr. 19, 2011

(54) METHOD FOR GENERATING MULTI-RESOLUTION THREE-DIMENSIONAL MODEL

(75) Inventor: Soo-Kyun Kim, Seoul (KR)

(73) Assignee: Samsung Electronics Co., Ltd., YeongTong-Gu Suwon-Si, Gyeonggi-Do (KR)

( * ) Notice: Subject to any disclaimer, the term of this patent is extended or adjusted under 35 U.S.C. 154(b) by 979 days.

(21) Appl. No.: 11/811,856

(22) Filed: Jun. 11, 2007

(65) Prior Publication Data

US 2008/0084413 A1 Apr. 10, 2008

(30) Foreign Application Priority Data

Oct. 10, 2006 (KR) .................. 10-2006-0098602

(51) Int. Cl.
*G06T 15/00* (2006.01)
*G06T 17/00* (2006.01)
(52) U.S. Cl. ...................... 345/419; 345/420
(58) Field of Classification Search .................. 345/419, 345/420
See application file for complete search history.

(56) References Cited

U.S. PATENT DOCUMENTS

| | | | | |
|---|---|---|---|---|
| 6,072,496 | A * | 6/2000 | Guenter et al. ............... | 345/419 |
| 6,208,347 | B1 * | 3/2001 | Migdal et al. ................. | 345/419 |
| 6,879,323 | B1 * | 4/2005 | Takezawa et al. ............ | 345/420 |
| 2002/0143419 | A1 * | 10/2002 | Praun et al. ................... | 700/98 |
| 2003/0206178 | A1 * | 11/2003 | Hoppe et al. ................. | 345/582 |
| 2004/0264745 | A1 * | 12/2004 | Gu et al. ....................... | 382/118 |
| 2005/0063582 | A1 * | 3/2005 | Park et al. ..................... | 382/154 |
| 2006/0067573 | A1 * | 3/2006 | Parr et al. ..................... | 382/154 |
| 2007/0031028 | A1 * | 2/2007 | Vetter et al. ................... | 382/154 |
| 2007/0091085 | A1 * | 4/2007 | Wang et al. ................... | 345/420 |
| 2007/0229498 | A1 * | 10/2007 | Matusik et al. ............... | 345/420 |
| 2008/0002908 | A1 * | 1/2008 | Chinen et al. ................ | 382/274 |
| 2010/0189342 | A1 * | 7/2010 | Parr et al. ..................... | 382/154 |

FOREIGN PATENT DOCUMENTS

KR 2005-86463 8/2005

OTHER PUBLICATIONS

Canny, "A Computational Approach to Edge Detection", Trans. on Pattern Analysis and Machine Intelligence, vol. 8, No. 6, Nov. 1986, pp. 679-698.*
Cootes et al., "Active Appearance Model", Jun. 2001, IEE, vol. 23, No. 6.*
Garland et al., "Surface Simplification Using Quadric Error Metrics", ACM '97, pp. 209-216.*
Lee et al., "Fast head modeling for animation", Mar. 2000, Journal Image and Vision Computing, vol. 18, No. 4, pp. 355-364.*

* cited by examiner

*Primary Examiner* — Ulka Chauhan
*Assistant Examiner* — Jeffrey Chow
(74) *Attorney, Agent, or Firm* — Cha & Reiter, LLC (57) ABSTRACT

Disclosed is a method for generating a multi-resolution three-dimensional model, and for extracting feature lines using texture images and geometric data from a three-dimensional model. First, contours are detected for texture images using an image processing on the texture-mapped three-dimensional mesh data. With respect to geometric data, a discrete curvature is measured. The geometric data is parametrized into parameters in a two-dimensional domain, and contour images are detected using an image processing. The detected two contour images are generated into one model map, which is then reversely mapped to a reverse three-dimensional model, then next feature lines are extracted. Accordingly, a multi-resolution three-dimensional model can be generated while maintaining the extracted feature lines.

6 Claims, 12 Drawing Sheets

MODEL MAP

SECOND CONTOUR IMAGES

FIRST CONTOUR IMAGES

METHOD FOR GENERATING MULTI-RESOLUTION THREE-DIMENSIONAL MODEL

CLAIM OF PRIORITY

This application claims the benefit under 35 U.S.C. §119 (a) of an application entitled "Method For Generating Multi-resolution Three-Dimensional Model" filed in the Korean Intellectual Property Office on Oct. 10, 2006 and assigned Serial No. 2006-98602, the contents of which are hereby incorporated by reference.

BACKGROUND OF THE INVENTION

1. Field of the Invention

The present invention relates to a method for generating a high-quality multi-resolution three-dimensional model, and more particularly to a method for extracting feature lines based on texture images and geometric data from a three-dimensional model, which is generated using three-dimensional range scan data.

2. Description of the Related Art

As three-dimensional range scanning systems using complex three-dimensional models have been widely used. With a rapid development of the three-dimensional range scanning systems, even a complex shape of real objects can be measured quickly and accurately. The three-dimensional models measured are being used in a variety of applied fields, such as medical image processing, animation, games, and reverse engineering.

Feature lines are typically required to be extracted in a set of points in a diversity of fields, such as visualization of the three-dimensional models, geometric modeling, and computer graphics. This is why the feature lines play an important role in parts, such as mesh reconstruction, shape analysis, and model subdivision.

Meanwhile, features of a model shape are extracted for improvement in visualization of a set of points and converted into triangle meshes. Extracting the feature lines from the set of points is closely related to the reconstruction of a mesh surface. Extracting the feature lines from the set of points can be utilize as preprocessing for the mesh reconstruction. For example, a method of directly extracting the feature lines from three-dimensional mesh data must use different operators. These techniques require complex processes using mesh operators, etc., such as filtering, thinning, and smoothing. Implicit surface fitting technique shows a good result among those techniques, but there exists a drawback in that a process of computing feature extraction time is complex. This is why approximation and projection in all parts of implicit surface are used in order to measure the curvature tensor and a curvature differential value for each vertex of a mesh.

What is more, a method for extracting a feature in the form of a line from the set of points of the three-dimensional mesh data requires a complex process and technique related to a weight of a feature part, surface construction, a threshold value, and smoothing. It is problematic that a user who is unaccustomed to the method cannot obtain a good result because the user may achieve the desired result only after several attempts. For example, even though a multi-scale classification operator is applied to point-sampled data in order to search for features in the line-form, the operator cannot search for feature lines while precisely discriminating between a ridge and a valley line. For this, not only is it impossible that a multi-resolution three-dimensional model is generated, but also feature parts, which are important in the process of creating a three-dimensional model, are feasible all together.

SUMMARY OF THE INVENTION

Accordingly, the present invention has been made to solve the above problems occurring in the prior art and provides additional advantages, by providing a method for extracting feature lines by using texture images and geometric data from a three-dimensional model which is textured by using three-dimensional range scan data, and for generating a multi-resolution model whose level satisfies a user's requirement.

In one embodiment, there is provided a method for generating a multi-resolution three-dimensional model according to an embodiment of the present invention. The method includes the steps of: receiving mesh data relevant to a three-dimensional model from a three-dimensional range scanning system; determining if the received mesh data corresponds to texture images, and detecting a first contour image from the texture images if the received mesh data corresponds to the texture images as a result of the determination; detecting a second contour image from geometric data if the received mesh data corresponds to the geometric data; creating the first contour image and the second contour image to be one model map; reversely mapping the model map to a three-dimensional model to extract feature lines; and calculating quadric errors relevant to the feature lines to generate a multi-resolution three-dimensional model.

BRIEF DESCRIPTION OF THE DRAWINGS

The above features, and advantages of the present invention will be more apparent from the following detailed description taken in conjunction with the accompanying drawings, in which.

DETAILED DESCRIPTION

Hereinafter, embodiments of the present invention will be described with reference to the accompanying drawings. The same elements will be designated by the same reference numerals all through the following description and drawings although they are shown in different drawings. Further, for the purposes of clarity and simplicity, a detailed description of known functions and configurations incorporated herein will be omitted as it may make the subject matter of the present invention rather unclear.

A method of generating a multi-resolution three-dimensional model according to the teachings of the present invention may be applicable to mobile communication terminals, such as a handheld terminal-digital camera, a Personal Digital Assistant (PDA), a Smart Phone (SP), Portable Multimedia Player (PMP), and the like.

Figure 1:
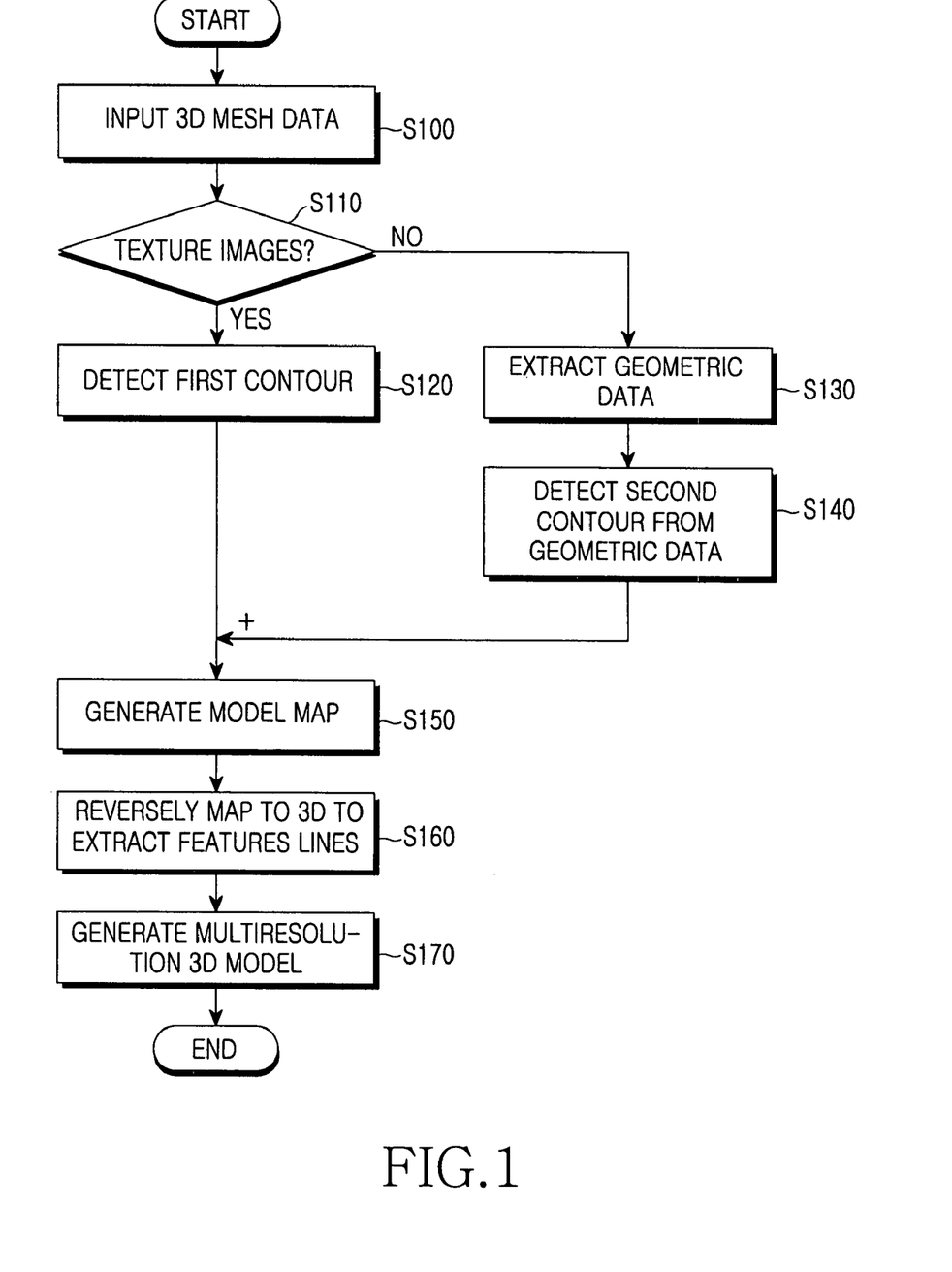
FIG. 1 is a flowchart illustrating a method for generating a multi-resolution three-dimensional face model according to an embodiment of the present invention.

FIG. 1 is a flowchart illustrating a method for generating a multi-resolution three-dimensional face model according to an embodiment of the present invention.

As illustrated in FIG. 1, the method of generating the multi-resolution three-dimensional model briefly includes: receiving mesh data relevant to a three-dimensional model from a three-dimensional range scanning system (S100); determining if the received mesh data corresponds to texture images (S110); detecting a first contour image from the texture images if the received mesh data corresponds to the texture images as a result of the determining (S120); detecting a second contour image from geometric data if the received mesh data corresponds to the geometric data (S130, S140); creating the first contour image and the second contour image to be one model map (S150); reversely mapping the model map to a three-dimensional model to extract feature lines (S160); and calculating quadric errors relevant to the feature lines to generate a multi-resolution three-dimensional model (S170).

Hereinafter, the method of generating the multi-resolution three-dimensional model cited in FIG. 1 will be described in detail with reference to FIGS. 2-11.

First, three-dimensional mesh data is received from a three-dimensional range scanning system in step 100.

Figure 2:
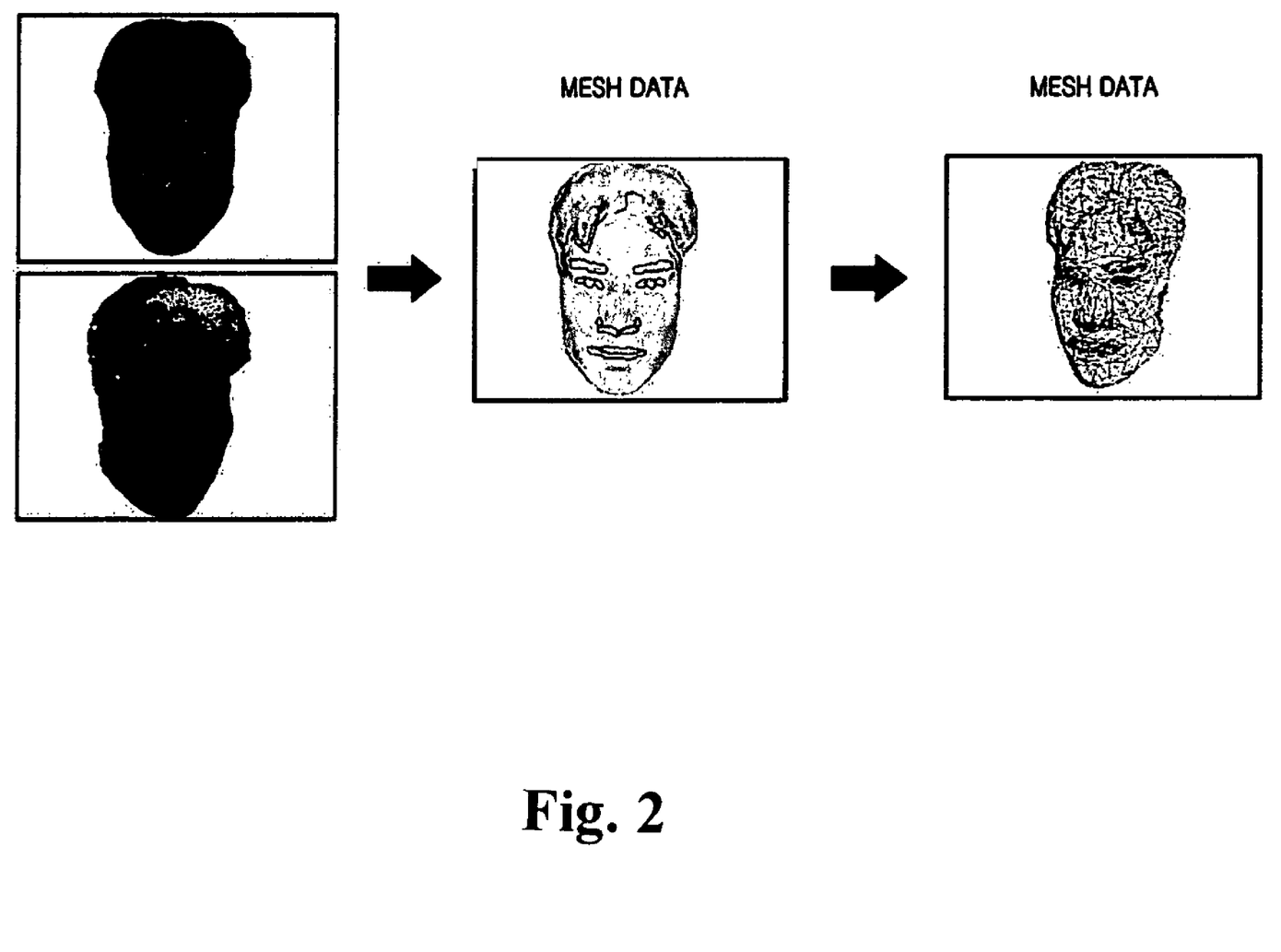
FIG. 2 is an example view illustrating three-dimensional face mesh data according to an embodiment of the present invention.

FIG. 2 illustrates the three-dimensional face mesh data according to the embodiment of the present invention.

Herein, the three-dimensional mesh data includes geometric data, texture images, and scan data, which is obtained by taking a picture of a person's face with a three-dimensional scanner. The three-dimensional range scanning system directly receives the scanned geometric data and the texture images, and scanning work is accomplished with just one photograph of the front of the person's face.

Figure 3:
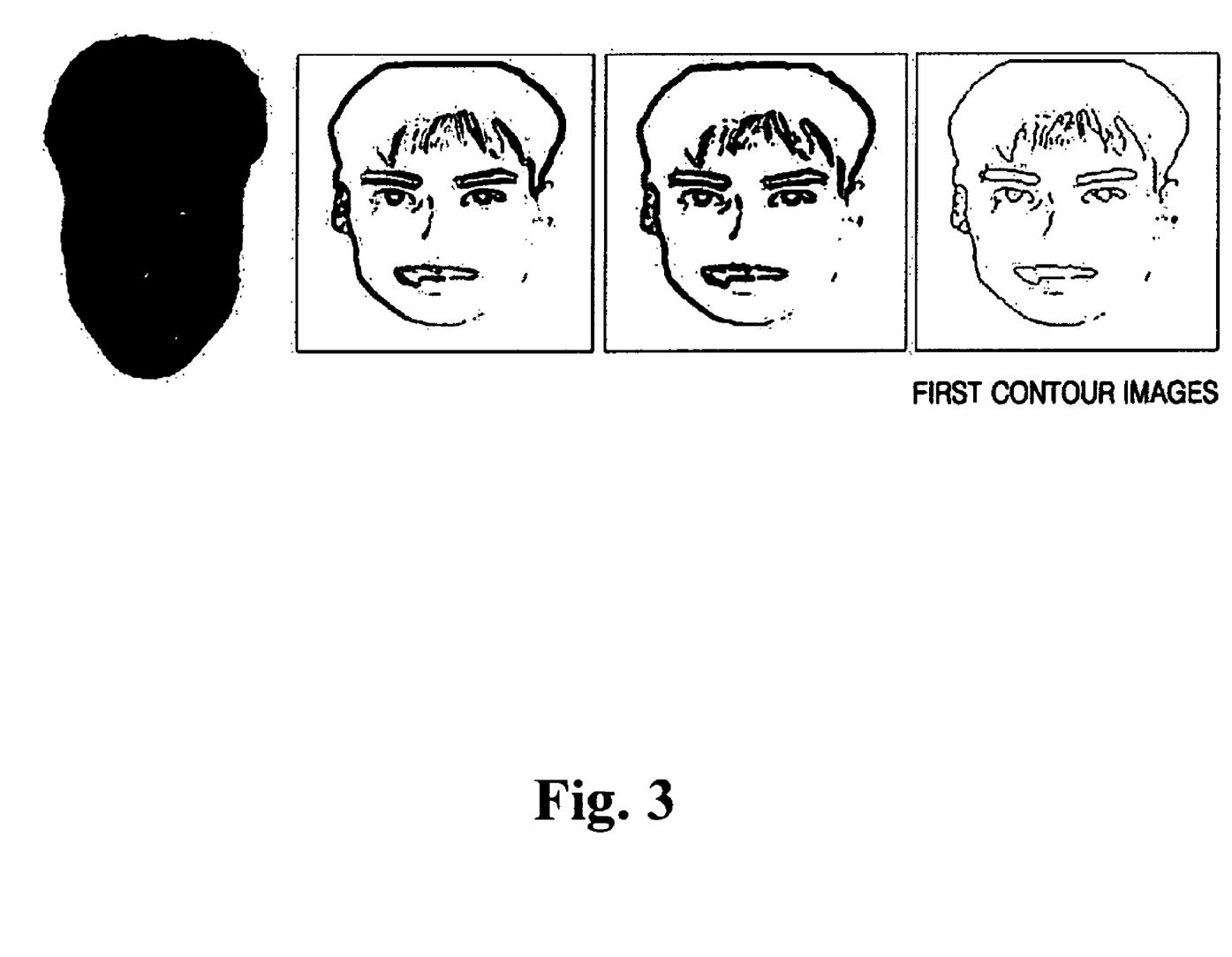
FIG. 3 shows a process for detecting a first contour images of the three-dimensional face mesh data according to an embodiment of the present invention.

FIG. 3 illustrates a process of detecting a first contour images of the three-dimensional face mesh data according to the embodiment of the present invention.

Next, in step 110, it is determined whether the received mesh data corresponds to texture images. If the received mesh data is not the texture images, the procedure moves to step 130 to extract geometric data from the received mesh data. On the contrary, if the received mesh data corresponds to the texture images, the procedure moves to step 120 to detect a first contour image from the texture images by using a Canny edge detection technique. Note that the Canny edge detection is well known in the art. Further, it will be apparent to those having reasonable skill in this art that it can be performed in a variety of ways. As illustrated in FIG. 3, the first contour images are detected from the texture images of a face model.

Herein, the contour corresponds to a feature denoting the boundary of a region within images, and represents discontinuities (i.e., points at which the brightness of a pixel suddenly changes) of the brightness of a pixel. Within the images, there exists a considerable difference in the brightness at the contour, and the contour corresponds to the boundary of an object. Here, the contour exists at discontinuity in pixel values or at discontinuities of differential values of pixels. There are a variety of contour detection methods known to those skilled in the art, and the contour, for example, may be detected using a diversity of masks performing a role of a differential operator. Here, each pixel can be differentiated from the continuous function since each pixel discontinues. Therefore, the contour can be detected by using the mask to differentiate each pixel. Further, a mask is a structure in the from of a sort of matrix, for placing a relevant thing in a prescribed part within the pictures. Mainly, square matrices such as 3×3, 5×5, 16×16, etc., may be used. Meanwhile, masks for detecting the contours are well known in the art that can be performed in a variety of ways, for example, other know process include a Sobel mask, a Prewitt mask, a Roberts mask, a Laplacian mask, and the like.

Figure 4:
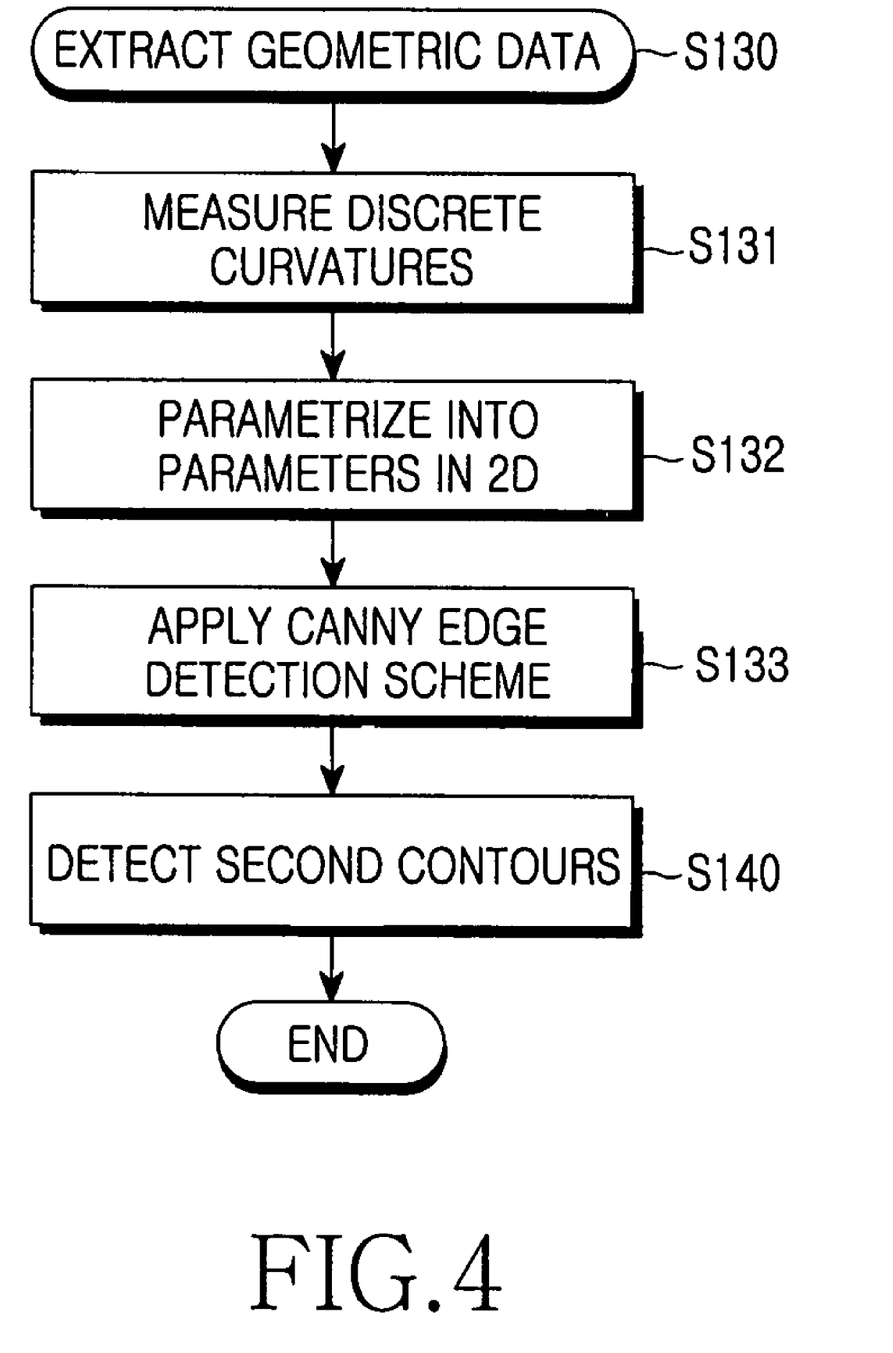
FIG. 4 is a flowchart illustrating a process for detecting a second contour images of the three-dimensional face mesh data according to an embodiment of the present invention.
Figure 5:
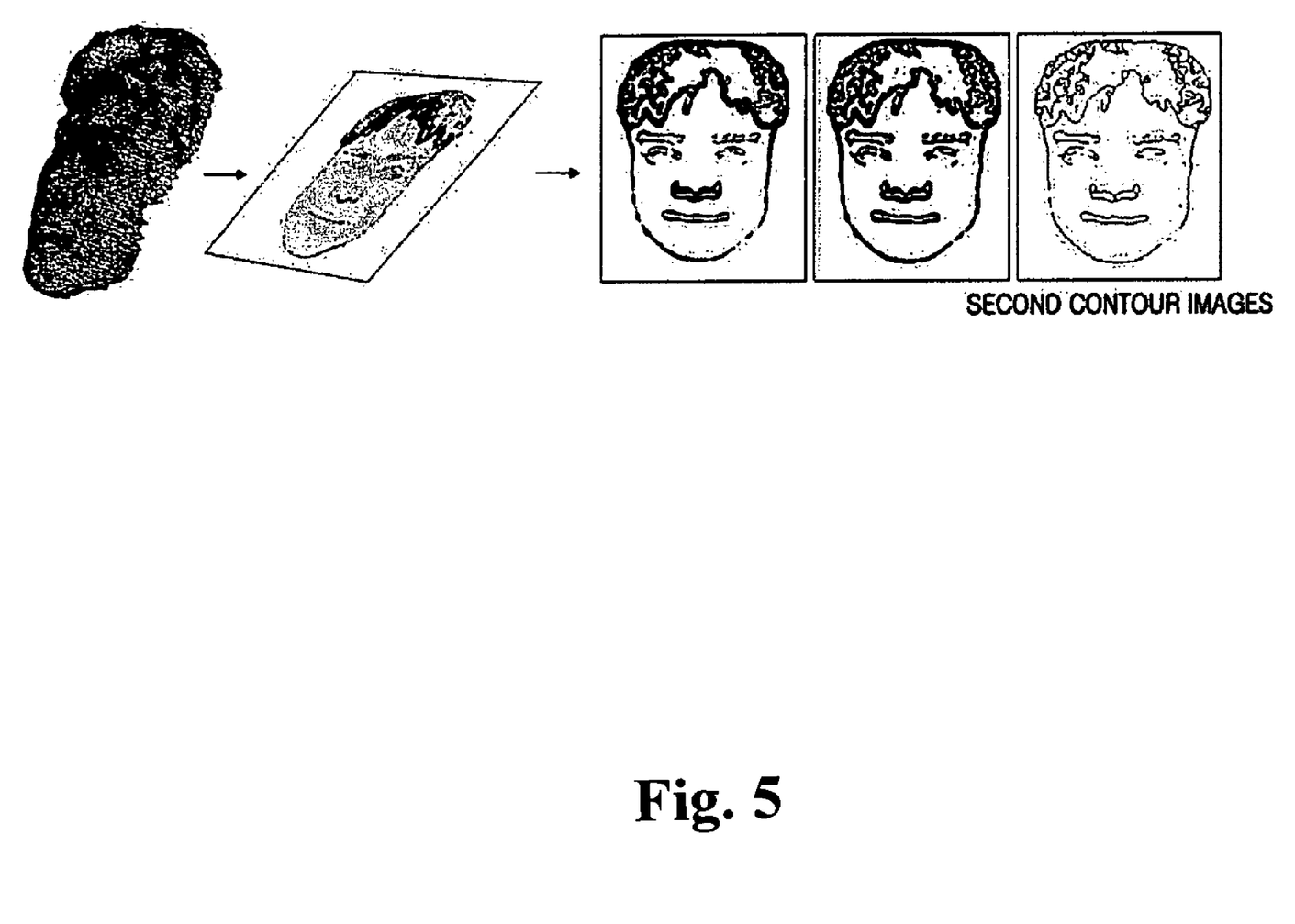
FIG. 5 shows a process for detecting a second contour images illustrating in FIG. 4.

FIG. 4 is a flowchart illustrating a detailed process of detecting a second contour images of the three-dimensional face mesh data of steps 130 and 140 according to an embodiment of the present invention. FIG. 5 is an example view showing a process of detecting a second contour images illustrating in FIG. 4.

Referring to FIG. 4, a discrete curvature is measured as in EXPRESSION 1 from geometric data extracted from the mesh data in step 131.

Expression 1
mean curvature:

$$K = \frac{(K_1 + K_2)}{2}$$

Gaussian curvature:

$$H = K_1 K_2$$

the absolute value of the sum of principal curvature:

$$K_1 + K_2 = \begin{pmatrix} 2|H| & \text{if } k \geq 0 \\ 2\sqrt{|H^2 - K|} & \text{otherwise} \end{pmatrix}$$

wherein K represents mean curvature that can be measured by calculating the mean of principal $K_1$ and $K_2$.

Next, in steps 132 and 133, curvature images of the face model obtained from the geometric data are parametrized into parameters in a two-dimensional domain, and the second contour images can be detected using the Canny edge detection technique in step 140.

Figure 6:
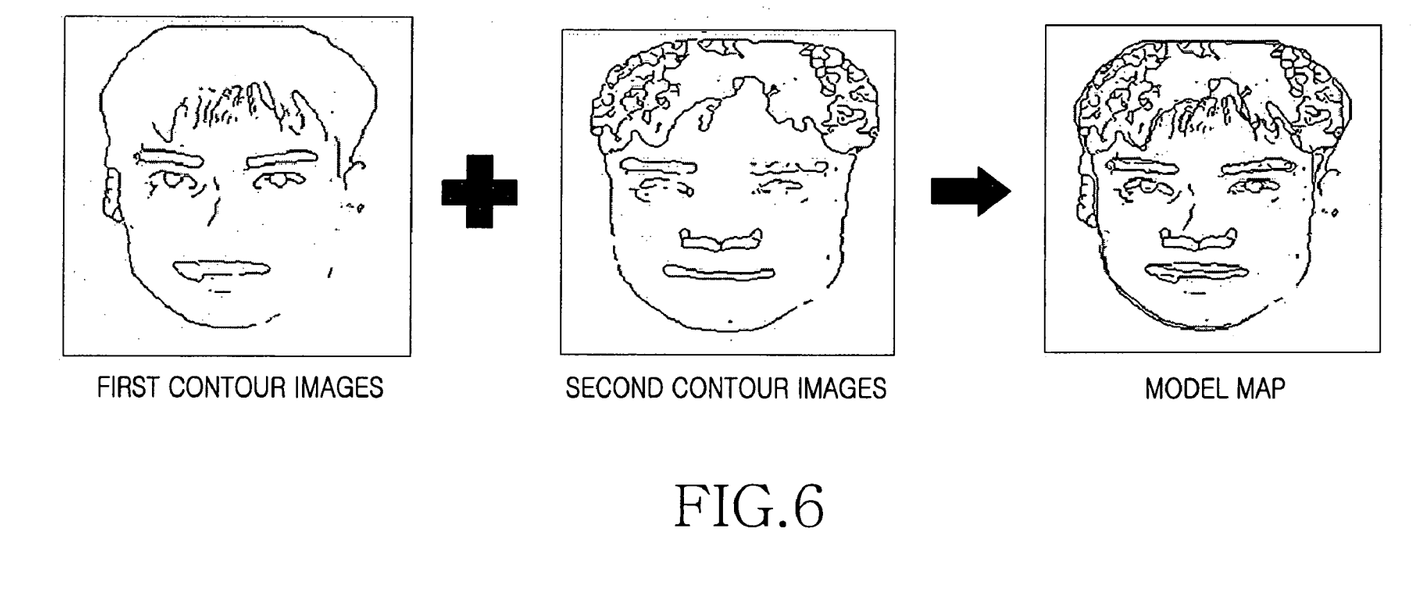
FIG. 6 shows a process for creating a model map from the three-dimensional face mesh data according to an embodiment of the present invention.

FIG. 6 illustrates a process of creating a model map from the three-dimensional face mesh data according to an embodiment of the present invention.

In step 150 of FIG. 1, the first contour image from the texture images of a three-dimensional face model and the second contour images detected by parametrizing discrete curvature information of the three-dimensional face model into the parameters in the two-dimensional domain, are combined to create a model map.

Here, "parametrizing" means the technique mapping the three-dimensional model to the two-dimensional domain, one to one. In step 150, the first contour image from the texture images of a three-dimensional face model and the second contour images detected by parametrizing discrete curvature information of the three-dimensional face model into the parameters in the two-dimensional domain, are combined to create a model map.

Figure 7A:
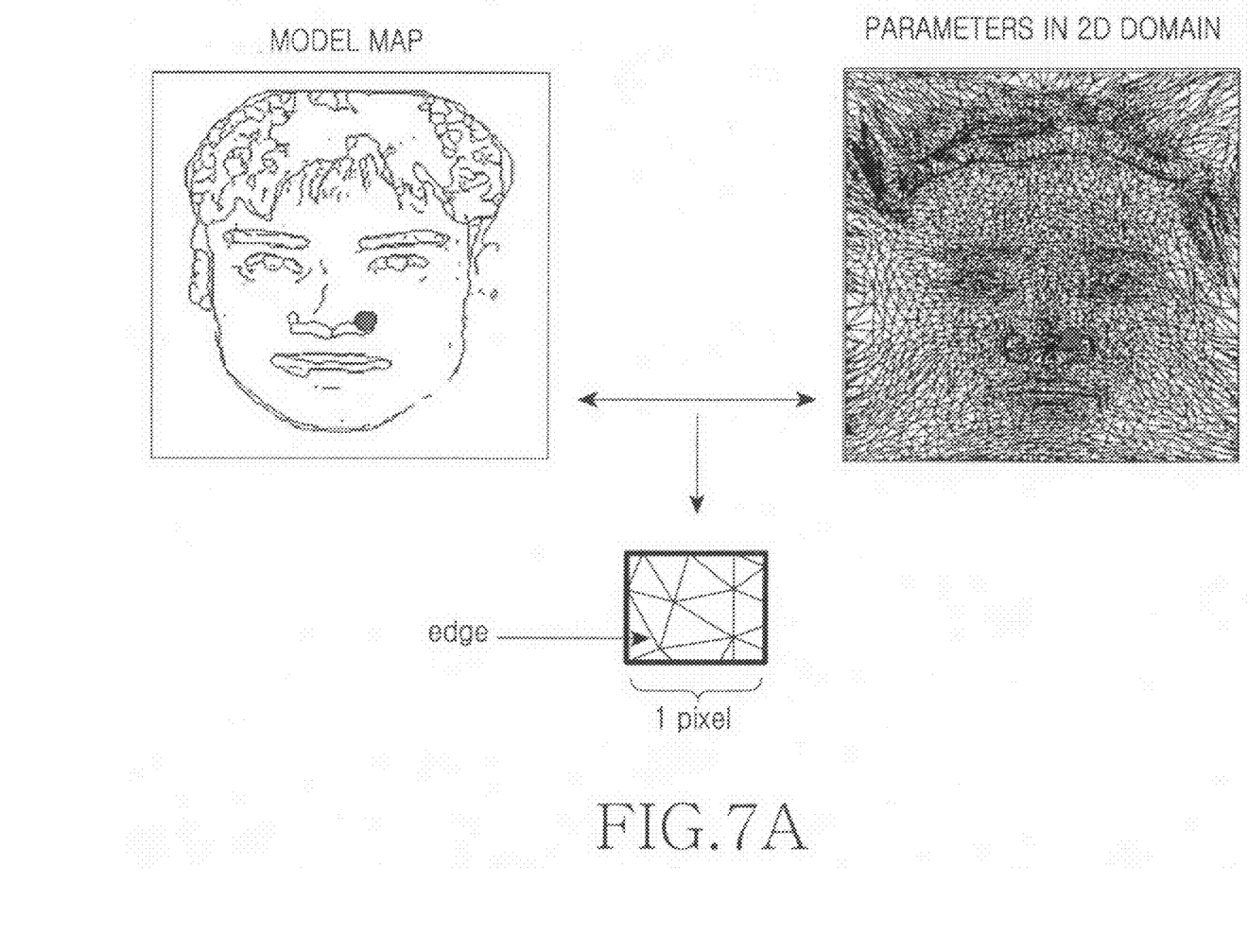
FIGS. 7A and 7B are example views showing processes for extracting feature lines from the model map illustrating in FIG. 6.
Figure 7B:
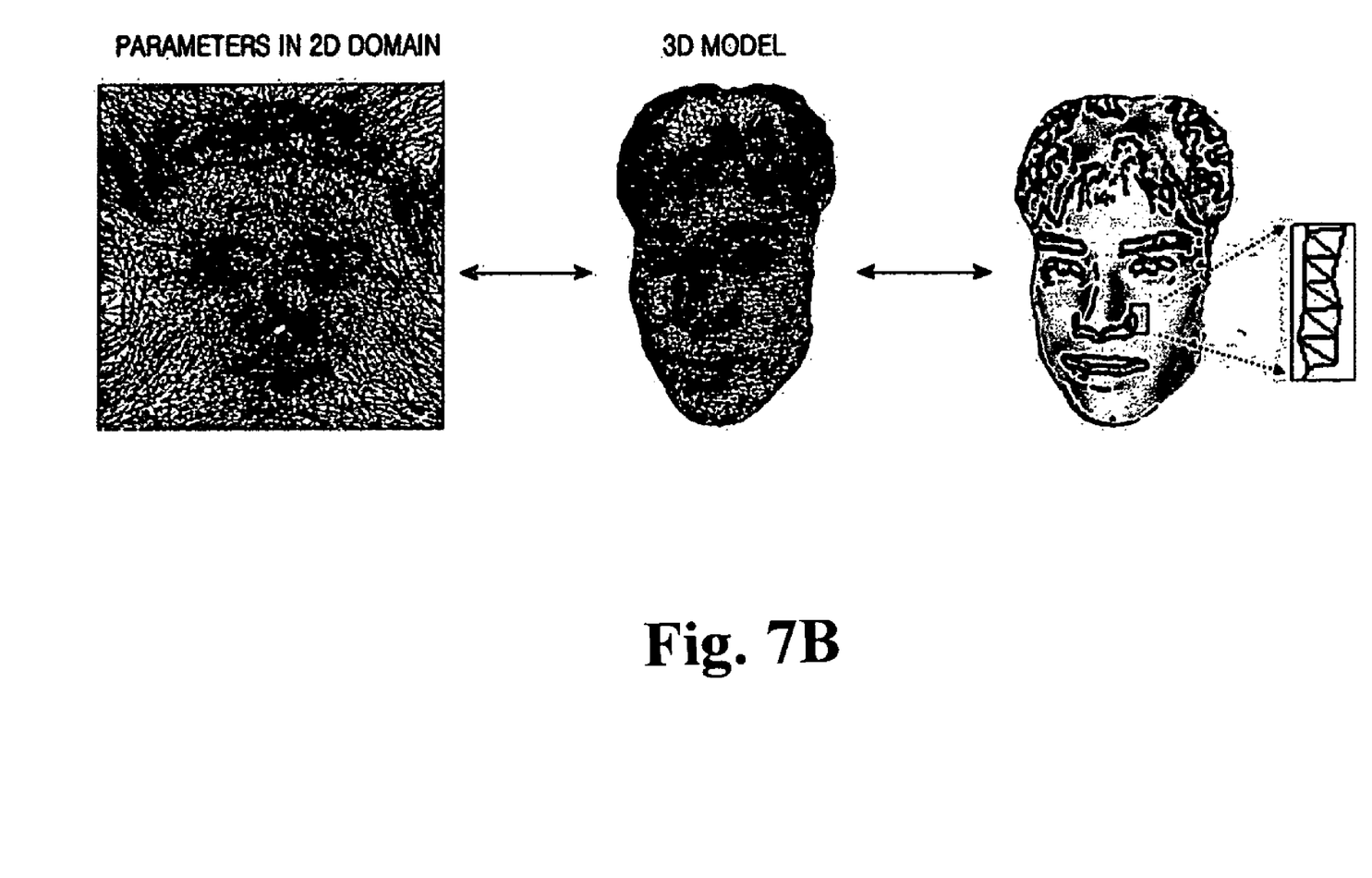

FIGS. 7A and 7B are example views showing the process of extracting feature lines from the model map illustrating in FIG. 6.

In step 160, the features lines are extracted by mapping again the model map, which has been created in step 150, to a three-dimensional model, reversely mapping the model map, which has been created in step 150, to a three-dimensional model, and the features lines in a geometric model are extracted by mapping the texture coordinates of the three-dimensional model to the model map and mapping texture coordinates of the geometric model to the model map.

Figure 8:
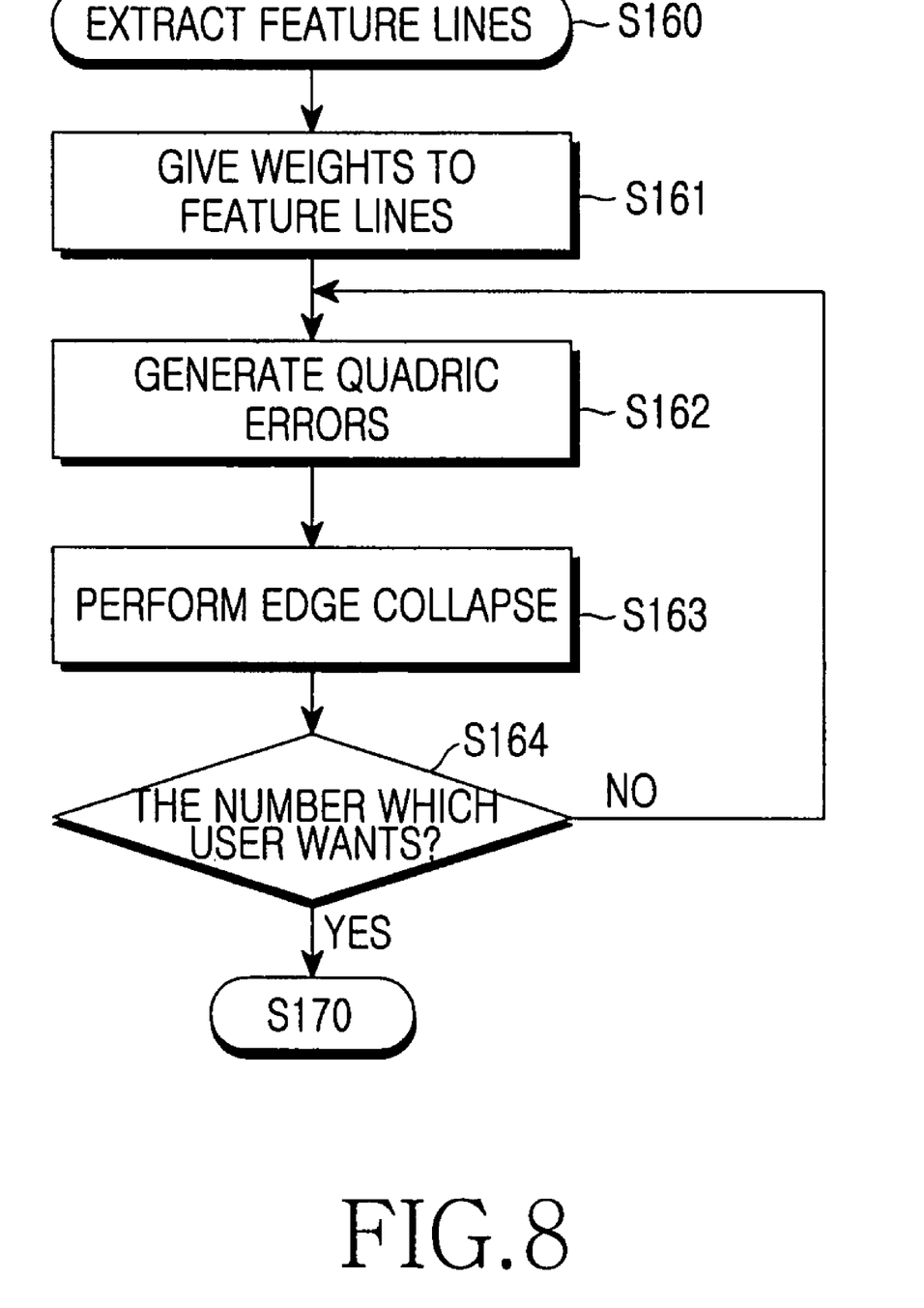
FIG. 8 is a flowchart illustrating a process for simplifying feature-preserving face data from the feature lines of the three-dimensional face mesh data according to an embodiment of the present invention.
Figure 9:
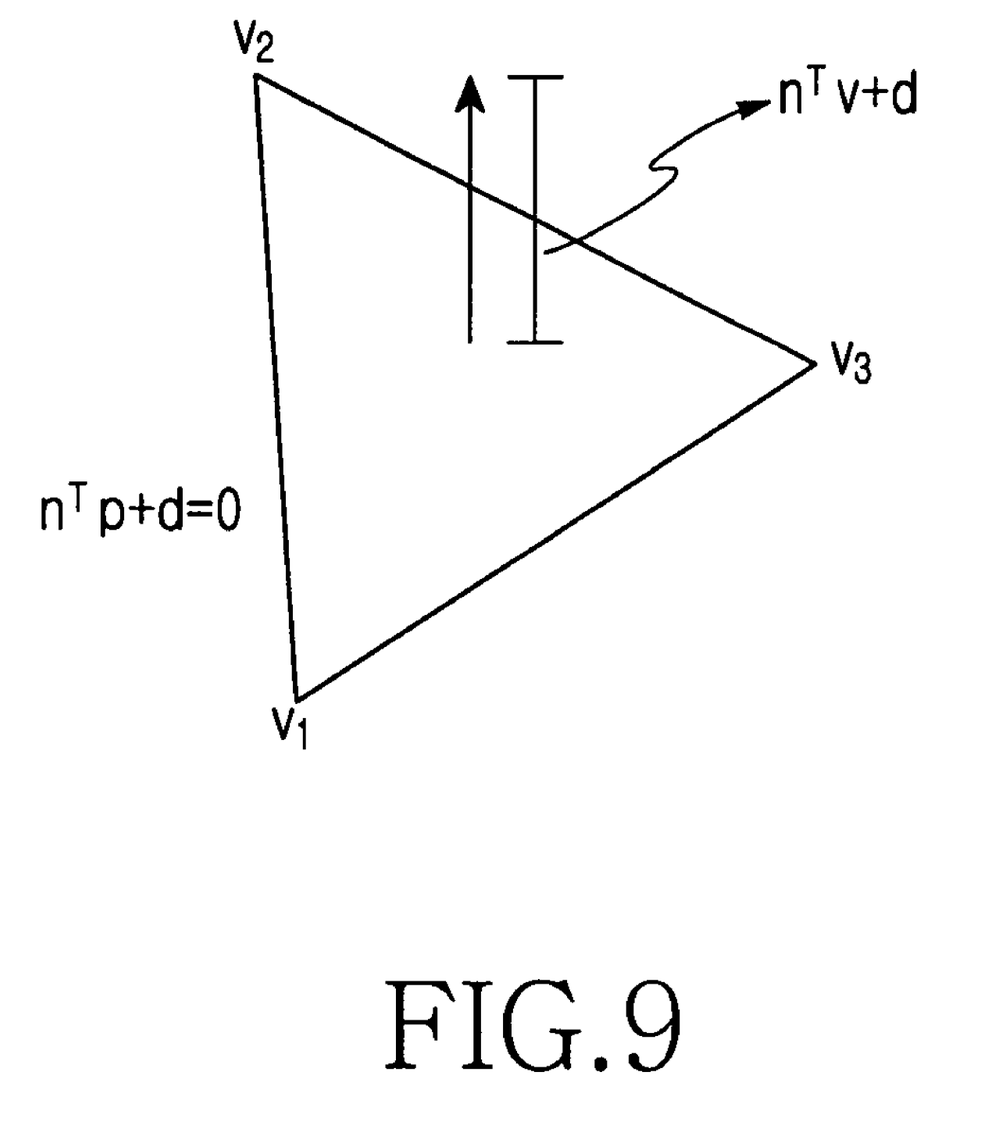
FIG. 9 is an example view illustrating quadric error metrics relevant to the feature lines of the three-dimensional face mesh data according to an embodiment of the present invention.

FIG. 8 shows a process of simplifying feature-preserving face data from the feature lines of the three-dimensional face mesh data according to an embodiment of the present invention. FIG. 9 is an example view illustrating quadric error metrics relevant to the feature lines of the three-dimensional face mesh data according to an embodiment of the present invention.

As illustrated in FIG. 8, a weight is given to each of the features lines in step 161.

In step 162, quadric error metrics, using the sum of a plane, a point and the square of distances are generated.

In step 163, the error metric is sorted by the Heap in order to collapse edges to one point.

In step 164, it is checked whether a user performs the collapse of edges, in which edges of the small error value start to collapse, by using the number that the user desires through the heap sort, in the steps 162 and 163.

The process for simplifying the face data which is performed in this way is described in more detail as follows.

First, a weight is given to an edge of a feature line as in step 161, then in step 162, quadric error metrics are calculated, and the sum of the square of distances from a plane to a point is obtained by using a plane expression 2, shown below.

$$Q^f(V) = (n^{-T}v + d)^2 = V^T A V + 2b^T V + C, \quad \text{EXPRESION 2}$$

$$Q^v(p) = \sum_{v_1 \in f} Q^f + \sum_{v_2 \in f} Q^f$$

"V" indicates the three-dimensional vertex coordinate.
"A" indicates 3×3 matrix.
"b" indicates 3-vector.
"c" indicates.

Figure 10:
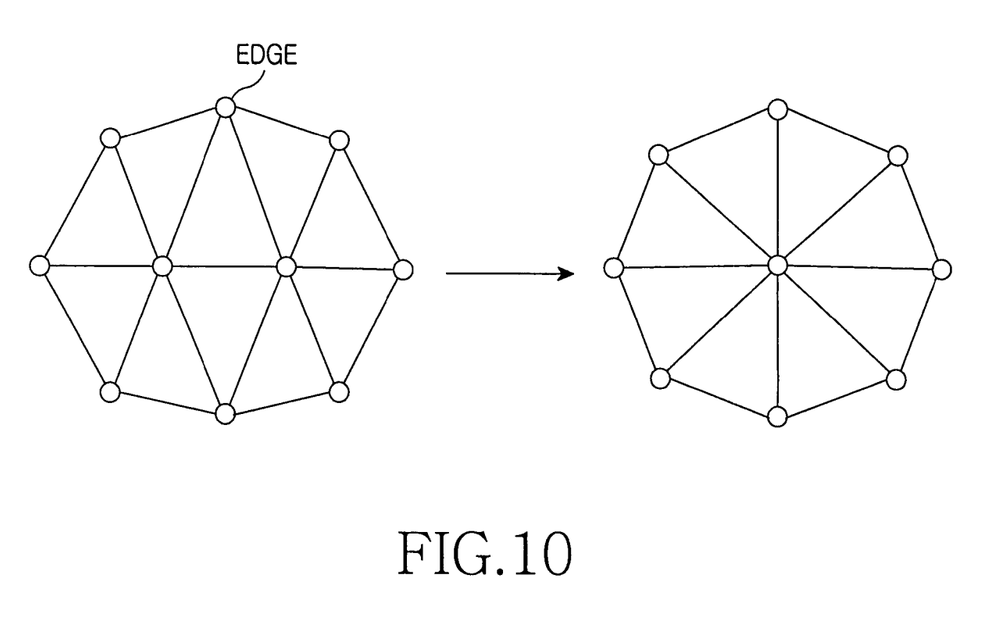
FIG. 10 is an example view showing an edge collapse relevant to the feature lines illustrating in FIG. 9.
Figure 11:
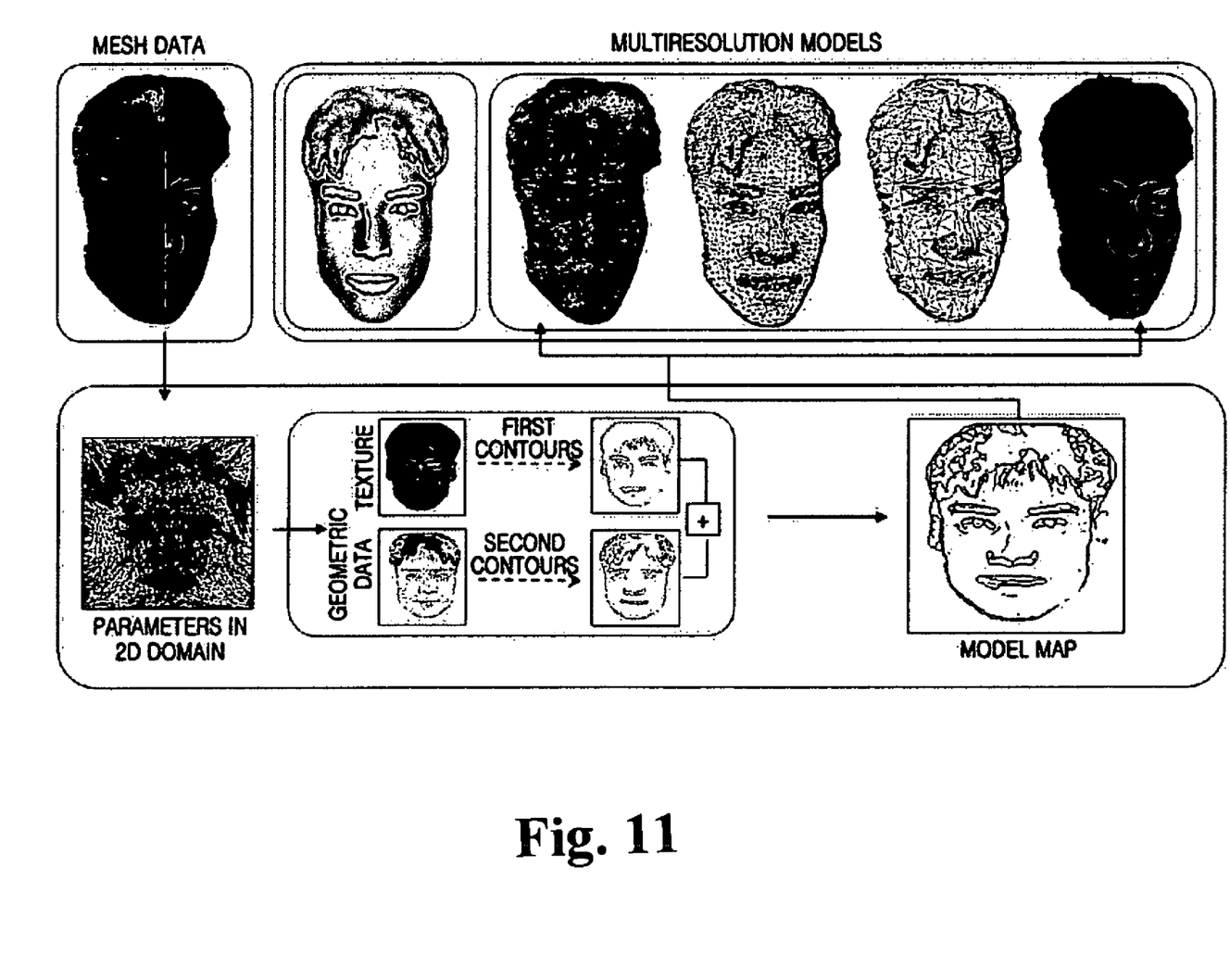
FIG. 11 is an example view illustrating an overall process for generating the multi-resolution three-dimensional face model according to an embodiment of the present invention.

FIG. 10 is an example view showing the performance of edge collapse relating to the feature lines illustrating in FIG. 9, and FIG. 11 is an example view illustrating an overall process of generating the multi-resolution three-dimensional face model according to an embodiment of the present invention.

Referring back to FIG. 8, the edge collapse is performed according to an error value (i.e., Q) in step 163. For example, as shown in FIG. 9, both ends of the vertices of an edge are united into one.

That is, in step 163, the edge collapse, in which edges of the small error value start to collapse, is performed according to an error value (i.e., Q).

Thereafter, in step 164, it is checked whether the user performs the steps 162 and 163. If the number by which the user performs the steps 162 and 163 does not satisfy the desired number by the user, the procedure moves to step 162. If, after the steps 162 and 163, satisfies the number that the user desires, the procedure moves to step 170 to generate a multi-resolution three-dimensional model as illustrated in FIG. 11.

In the present invention constructed as described above, the feature lines are extracted by using texture images and geometric data from a three-dimensional model, which is texture-mapped by using three-dimensional range scan data, heap sorting the error value using the quadric error metric in order to simplify, wherein the heap is the structure for searching for nodes having the highest key value or the smallest key value as quickly as possible, and also, the heap is sorted so that the portion, which has the feature, but the small error value by giving a weight to the specific portion of the quadric error metric, is simplified later. Note that extracted feature lines are maintained by performing repeatedly the above step. Therefore, users who use complex three-dimensional mesh models can generate a multi-resolution three-dimensional model whose level satisfies the user's requirements.

Therefore, users who use complex three-dimensional mesh models can generate a multi-resolution three-dimensional model whose level satisfies the user's requirements.

While the invention has been shown and described with reference to a certain preferred embodiment thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for generating a multi-resolution three-dimensional model, the method comprising the steps of:
   receiving texture-mapped three-dimensional face mesh data from a three-dimensional range scanning system;
   determining if the received mesh data corresponds to texture images, and
   detecting a first contour image from the texture images if the received mesh data is determined to be the texture images;
   detecting a second contour image from geometric data if the received mesh data corresponds to the geometric data;
   generating a model map by combining the first contour image and the second contour image;
   reversely mapping the model map to a three-dimensional model to extract feature lines; and
   calculating quadric errors corresponding to the feature lines to generate the multi-resolution three-dimensional model.

2. The method as claimed in claim 1, wherein the determining step uses a Canny edge detection scheme in detecting the texture images of the mesh data.

3. The method as claimed in claim 1, wherein the detecting step comprises the steps of:
   measuring discrete curvatures from the geometric data;
   parameterizing the measured geometric data into parameters in a two-dimensional domain; and
   detecting the second contour image using a Canny edge detection scheme from the parameterized geometric data.

4. The method as claimed in claim 1, wherein the mapping step extracts by mapping texture coordinates of a geometric model to the model map.

5. The method as claimed in claim 1, wherein the calculating step comprises the steps of:
 (A) giving a weight to an edge of the feature lines;
 (B) generating quadric error metrics of the feature lines; and
 (C) performing a collapse of the edge of the generated quadric error metrics.

6. The method as claimed in claim 5, further comprising the step of
 (D) checking if the steps (B) and (C) meets criteria set by a user, and if not repeating steps (B) and (C).

* * * * *

UNITED STATES PATENT AND TRADEMARK OFFICE
CERTIFICATE OF CORRECTION

| | | |
|---|---|---|
| PATENT NO. | : 7,928,978 B2 | Page 1 of 1 |
| APPLICATION NO. | : 11/811856 | |
| DATED | : April 19, 2011 | |
| INVENTOR(S) | : Soo-Kyun Kim | |

It is certified that error appears in the above-identified patent and that said Letters Patent is hereby corrected as shown below:

Column 2, Line 34 insert the following paragraph:

--The patent or application file contains at least one drawing executed in color. Copies of this patent or patent application publication with color drawings will be provided by the U.S. Patent Trademark Office upon request and payment of the necessary fee.--

Signed and Sealed this
Twenty-fourth Day of April, 2012

David J. Kappos
*Director of the United States Patent and Trademark Office*